United States Patent
Rubin et al.

(10) Patent No.: US 7,475,178 B2
(45) Date of Patent: Jan. 6, 2009

(54) HOT-PLUG LINK APPARATUS AND METHOD USING A DIRECTION LINE TO INDICATE PRESENCE OF A HOT-PLUG DEVICE

(75) Inventors: Gyorgy Rubin, Burlington, MA (US); Joseph J. Ervin, Stow, MA (US); Glenn A. Dearth, Groton, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 357 days.

(21) Appl. No.: 11/506,340

(22) Filed: Aug. 18, 2006

(65) Prior Publication Data

US 2008/0046624 A1 Feb. 21, 2008

(51) Int. Cl.
*G06F 13/40* (2006.01)
*G06F 13/42* (2006.01)

(52) U.S. Cl. .................................. 710/110; 710/31
(58) Field of Classification Search ......... 710/300–304, 710/110, 31, 105, 106
See application file for complete search history.

(56) References Cited

U.S. PATENT DOCUMENTS

| | | | |
|---|---|---|---|
| 5,758,098 A * | 5/1998 | Townsley et al. ............ 710/301 |
| 6,289,402 B1 * | 9/2001 | Davis ........................... 710/31 |
| 6,434,650 B1 * | 8/2002 | Morris et al. ................ 710/110 |
| 6,718,416 B1 * | 4/2004 | Self et al. .................... 710/302 |
| 6,748,442 B1 * | 6/2004 | Keller ......................... 709/232 |
| 7,082,488 B2 * | 7/2006 | Larson et al. ............... 710/301 |
| 7,220,908 B2 * | 5/2007 | Okamura ..................... 84/603 |
| 7,340,537 B2 * | 3/2008 | Vogt ............................. 710/2 |
| 7,340,541 B2 * | 3/2008 | Castro et al. ................. 710/31 |

* cited by examiner

*Primary Examiner*—Glenn A Auve
*Assistant Examiner*—Trisha Vu
(74) *Attorney, Agent, or Firm*—Osha • Liang LLP

(57) ABSTRACT

An apparatus for linking a hot-plug device to a host includes a slave interface circuit for connection to the host; a master interface circuit for connection to the hot-plug device; and direction, data, and clock lines that link the master and slave interface circuits. A control logic circuit detects a Presence Detect signal on the direction line. A method of determining a connection between a host and a hot-plug device includes asserting a direction signal on a direction line to control a direction of a flow of data between the host and the hot-plug device; toggling the direction signal to indicate a presence of the hot-plug device; and indicating a disconnect after a given period of inactivity in the toggling. A method of linking a host and a hot-plug device interface circuit for connection to a hot-plug device includes asserting a Presence Detect signal on the direction line.

20 Claims, 5 Drawing Sheets

| DIRECTION | DATA |
|---|---|
| 0 | MASTER TO SLAVE |
| 1 | SLAVE TO MASTER |

HOT-PLUG LINK APPARATUS AND METHOD USING A DIRECTION LINE TO INDICATE PRESENCE OF A HOT-PLUG DEVICE

BACKGROUND ART

Hot-plug, also known as hot-swapping, refers to the ability to add and remove components from a computer system while a computer's main power is on and have the operating system recognize the change. Hot-plug allows components to be inserted and removed without rebooting the system. Protocols that support hot-plug include PCMCIA, USB, FireWire, Fibre Channel, and SATA. Hot-plug components include USB drives, server hard drives, PCI-X or PCI Express expansion cards, PCMCIA cards, and some power supplies.

Hot-plug support from a system perspective requires a number of hardware and software mechanisms to be developed. First, the system needs to be able to detect when a component is inserted or removed. In addition, all electrical and mechanical connections must be designed such that neither the component nor the user will be harmed by inserting or removing it. Other components in the system must also be designed such that a hot-plug event does not harm their operation.

Simple hot-plug implementations usually require a shut down procedure to be performed prior to removal. Often such devices are not robust when the component fails, and these types of hot-plug operations are reserved for moving peripheral devices from one system to another, or for synchronizing data between a device and a computer. More complex hot-plug implementations usually contain enough redundancy such that even if a shut down procedure is recommended, operation would continue if a device were removed without executing the shut-down procedure. Hot-plug operations of these types are used for regular system maintenance or broken component replacement.

PCIe Express Module (EM) is an industry standard hot-swappable I/O add-in card, used for server applications. The model requires a number of electrical switches to control power and interface signals, referred to as side-band signals, on the host side of the interface to prevent damage to the card or host system during hot-plug operations. In addition to eight side-band signals, both the host and the EM require Presence Detect signals, making ten interface signals in total between the host and the EM.

In a blade server environment, tens of hosts, and several tens of industry standard EMs can be used. In the case of PCIe internal connectivity between the hosts and EMs, several hundreds of side-band signals may need to be rooted in the chassis mid-plane, causing complex and expensive mid-plane or back-plane design for a blade server.

SUMMARY OF INVENTION

In one aspect, one or more embodiments involve an apparatus for linking a hot-plug device to a host comprising: a master interface circuit for connection to the host; a slave interface circuit for connection to the hot-plug device; a direction line, a data line, and a clock line that link the master and slave interface circuits, wherein: the data line communicates and combines data signals between the master and slave interface circuits; the direction line dictates a direction of a flow of the data based on a direction signal; and the clock line synchronizes the flow of the data based on a clock signal; and a control logic circuit that detects a Presence Detect signal on the direction line.

In one aspect, one or more embodiments involve a method of determining a connection between a host and a hot-plug device comprising: asserting a direction signal on a direction line to control a direction of a flow of data between the host and the hot-plug device; toggling the direction signal to indicate a presence of the hot-plug device; and indicating a disconnect after a given period of inactivity in the toggling.

In one aspect, one or more embodiments involve a method of linking a host and a hot-plug device via an apparatus comprising a master interface circuit for connection to the host, and a slave interface circuit for connection to the hot-plug device, the method comprising: transferring data between the master and slave interface circuits; controlling a direction of a flow of the data based on a direction signal on a direction line; synchronizing the flow of the data based on a clock signal on a clock line; and asserting a Presence Detect signal on the direction line.

Other aspects and advantages of the invention will be apparent from the following description and the appended claims.

DETAILED DESCRIPTION

Embodiments of the present invention will be explained in detail below with reference to the figures. Like elements are denoted by like reference numbers throughout the figures.

Figure 1:
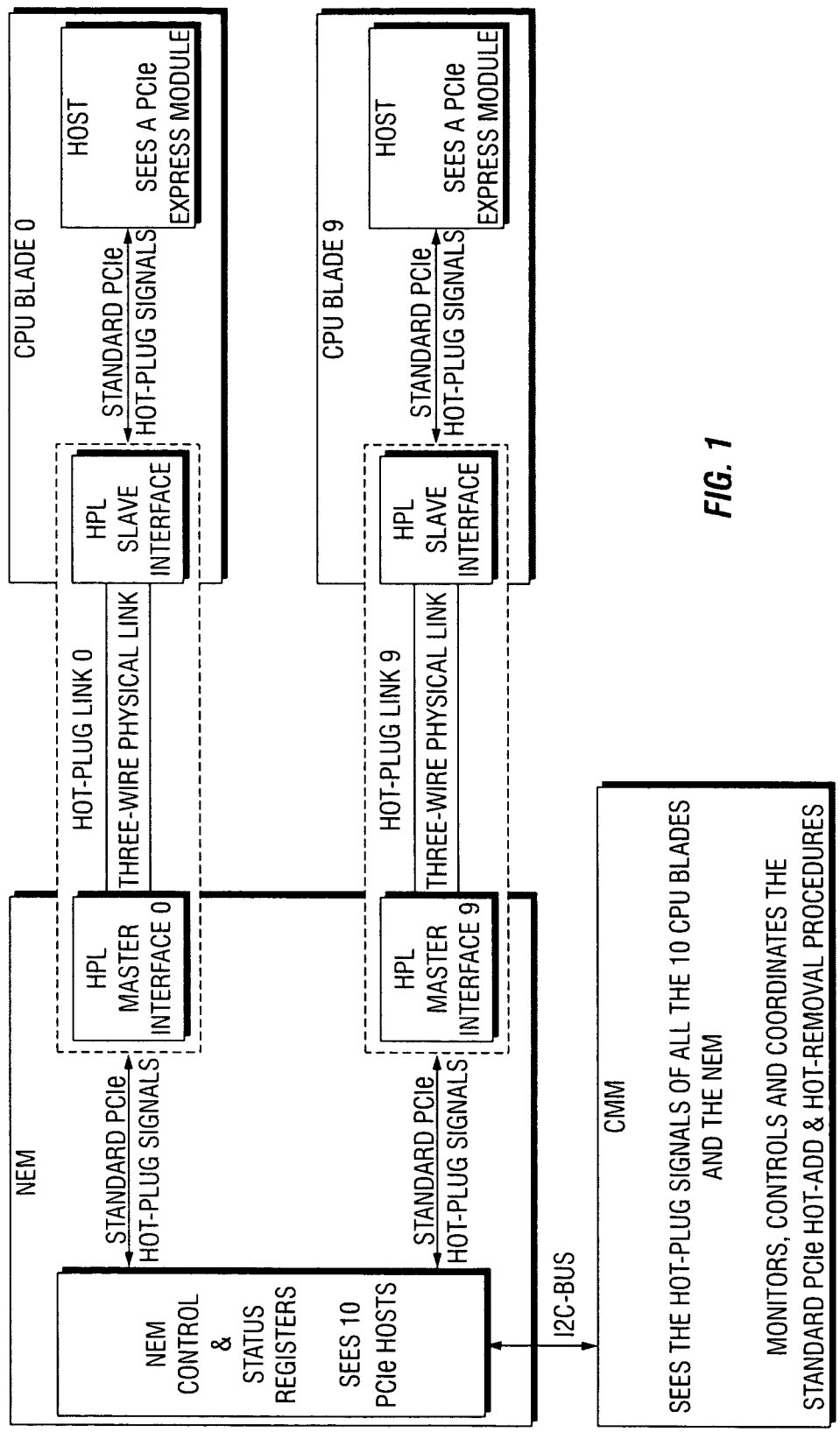
FIG. 1 illustrates a high level block diagram of a hot-plug link connecting hosts to hot-plug devices in accordance with one or more embodiments.

In one embodiment of the present invention, three lines provide a physical link between at the front end of a master interface circuit and a slave interface circuit. In one embodiment of the present invention, both the master interface and the slave interface provide standard PCIe hot-plug signals (so called PCIe side-band signals) at their back end. The master interface circuit corresponds to circuitry of a peripheral hot-plug device and the slave interface circuit corresponds to circuitry of a host device. As shown in FIG. 1, embodiments of the present invention may link between a plurality of host and hot-plug devices, for example, connecting CPU Blade servers to a SUN proprietary standard Network Express Module (NEM), which integrates ten industry standard PCI-Express Modules (EM). A CPU Blade may also host to up to four NEM hot-plug devices.

Figures 2, 3:
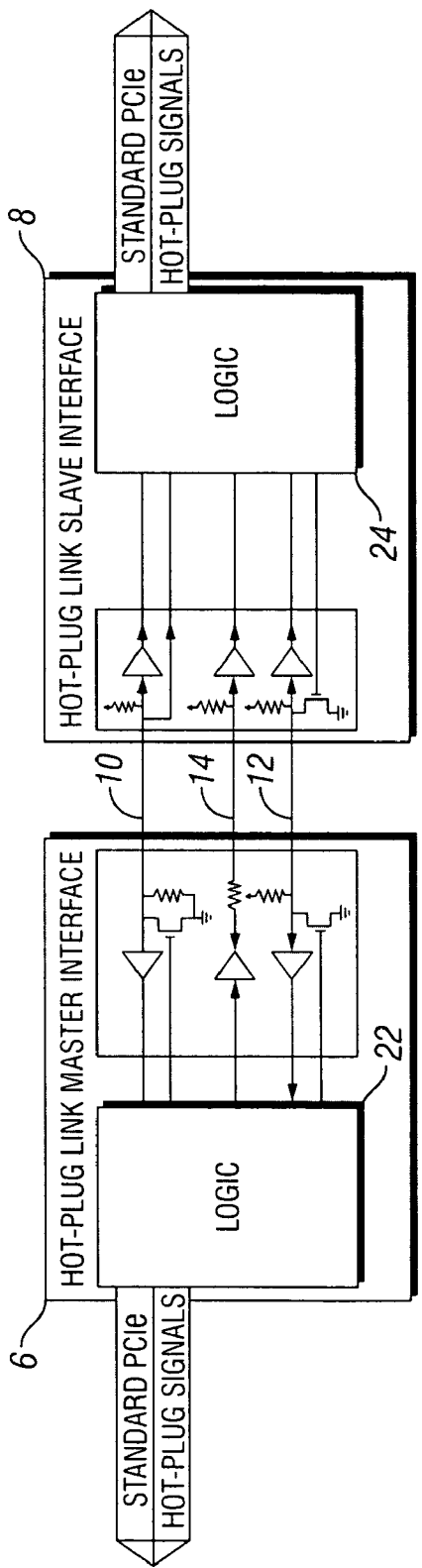
FIG. 2 shows internal details of a hot-plug link master interface and hot-plug link slave interface in accordance with one or more embodiments.
FIG. 3 illustrates a table for data flow for one or more embodiments.

As illustrated in FIG. 2, in one or more embodiments, three lines communicate the direction (10), data (12), and clock (14) signals between the master and slave interface circuits. The direction (10) and clock (14) signals are chiefly driven by the master interface circuit. The data signal (12) is bi-directional, and can be driven by either the master or slave interface circuit. This allows data to be communicated in either direction across the line. One skilled in the art will appreciate that the direction (10) or clock (14) signals may be chiefly driven by the master interface circuits.

The direction signal (10) controls which direction data is communicated. In one or more embodiments, as shown in FIG. 3, the direction signal is represented with logical voltage values. A logical '0' asserted corresponds to data sent from the master to slave interface circuit, while a logical '1' asserted corresponds to data sent from the slave to the master interface circuit. One skilled in the art will appreciate the opposite logical values being asserted for the above mentioned data flow. Additionally, the direction signal is not limited to solely conveying the direction of data flow. As will be explained in detail later, the direction signal can also be used to convey the Presence Detect information.

The clock signal (14) synchronizes data flow between the master and slave interface circuits. A clock signal conveys information regarding when a single data bit starts and when a single data bit ends. In practice, a clock signal is implemented with a periodic square wave voltage signal. One skilled in the art will appreciate that other types of clock signals may also be used to synchronize data flow.

The data line (12) is used for communication of data between the master and slave interface circuits in a format of serial stream of data bits. The data line is a bi-directional channel, and data signals are driven by either the master (6) or slave (8) interface circuit at a given moment in time. In one or more embodiments, the data line signal communicates and combines a plurality of standard PCIe data signals onto one physical line. One skilled in the art will recognize that the data line can have a wide variety of data signals over a variety of wires to communicate data information between the master and slave interface circuit.

Figure 4:
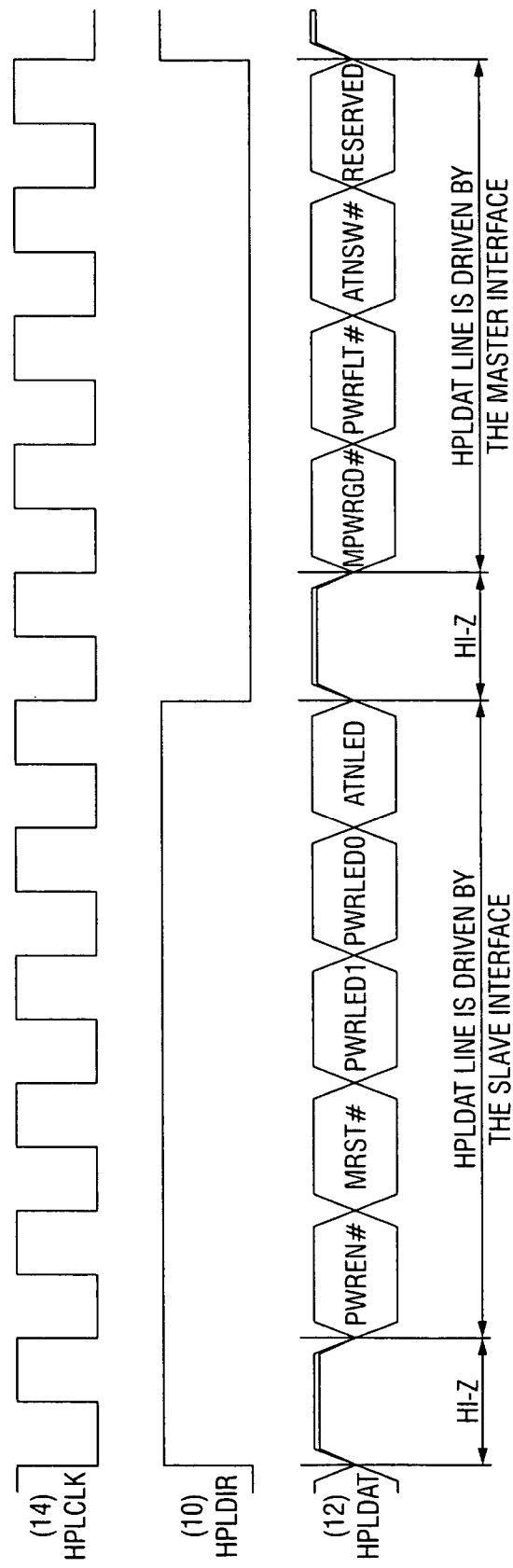
FIG. 4 illustrates a waveform diagram illustrating timing, toggling, and data transfer of a hot-plug link in accordance with one or more embodiments.

FIG. 4 details a timing diagram illustrating a method of transferring data signals and toggling the voltage in the direction line. In standard EM devices there are roughly 10 data signals communicated between the EM and the Host. In one or more embodiments of present invention, each data signal is communicated and sampled on the data line. The data line is divided into 11 clock cycles. During 5 clock cycles, the data line is driven by the slave interface circuit and communicates 5 standard hot-plug link signals. During 4 clock cycles, the data line is driven by the master interface circuit and communicates 4 standard hot-plug link signals. Between the slave interface circuit driving the data line and the master interface circuit driving the line, or vice versa, the data line is held in a Hi-Z state. This accounts for 11 clock cycles total. Additionally, in order to sample each hot-plug signal accurately, the refresh rate of the hot-plug signals is 11 clock cycles of the clock line signal. In one or more embodiments, the clock line signal is 100 kHz with a duty cycle of 50%+/−20%. Resultantly, the refresh period of the hot-plug signals is 110 µs. One skilled in the art will recognize that other frequencies and refresh rates may be used, and additionally, the order and name of the hot-plug signals communicated may be entirely arbitrary.

Figure 5:
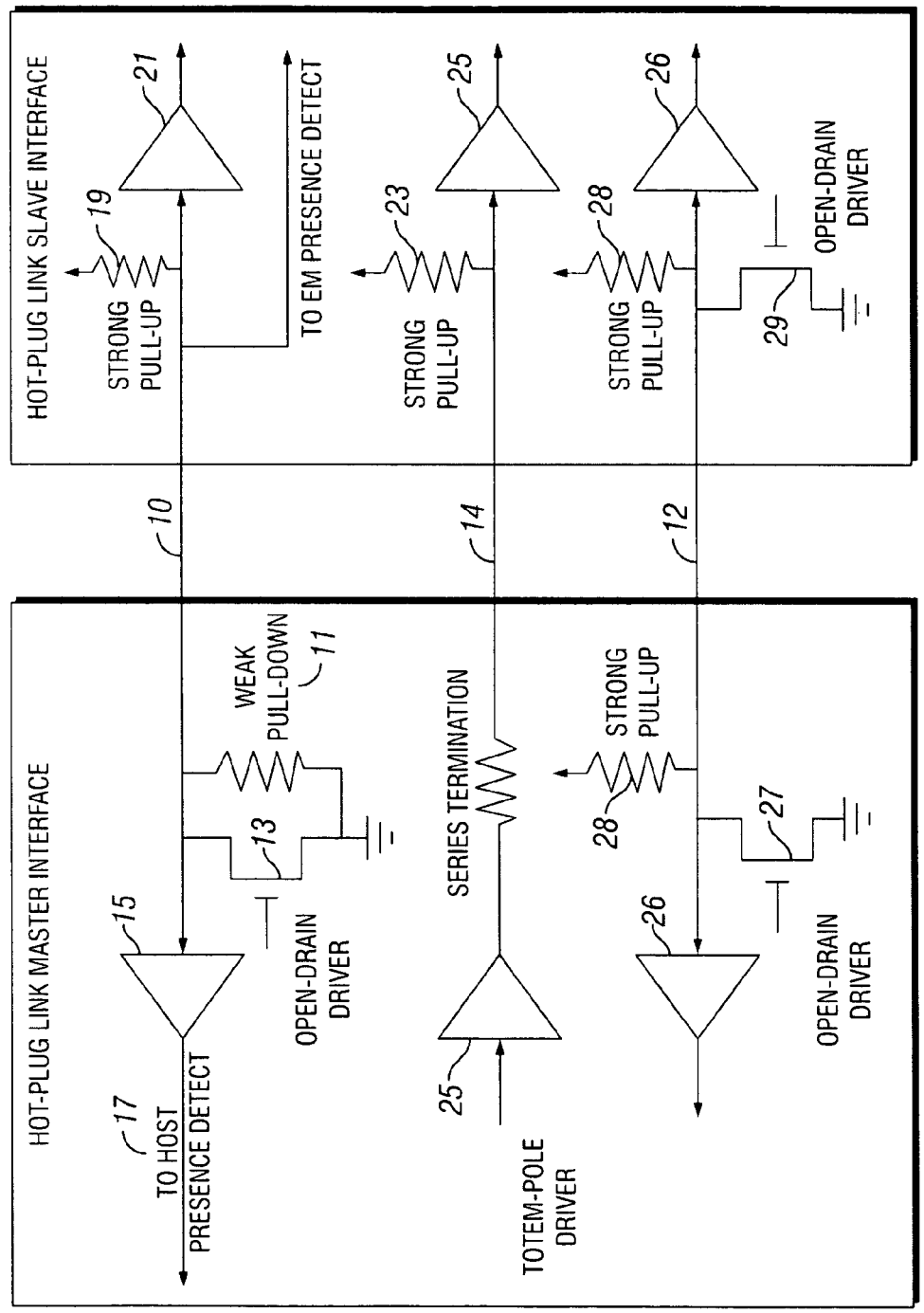
FIG. 5 illustrates a detailed view of driver and receiver networks in accordance with one or more embodiments.

Additionally, in one or more embodiments, strong pull-up and weak pull-down networks are employed in both the master and slave interface circuit. FIG. 5 details these networks with a combination of drivers, resistors, and buffers. In active operation, that is, when both the master and slave interface circuits are powered and connected, a direction signal is properly communicated from the master interface circuit (6) to the slave interface circuit (8). On the master interface side, the direction line (10) is connected to a weak pull-down resistor (11) and may be driven by an open-drain n-mos transistor (13). Connected to the direction line (10) is a unity gain buffer (15). The unity gain buffer (15) relays the voltage signal on the direction line (10) to a line (17) of the host device, and separates the load of Presence Detect Circuitry in the logic block (22). On the slave interface side, a strong pull-up resistor (19) connects a Vdd voltage source to the direction line (10). Similarly, a wire connects to a line of the hot-plug device, and a unity gain buffer (21) relays the direction line signal (10) to the Presence Detect circuitry in the logic block (24) of the slave interface circuit. To assert the direction line signal (10) to a low voltage, the open-drain driver (13) provides an active conducting path to ground. To assert the direction line signal (10) at a high voltage, the open-drain driver (13) breaks its path to ground. The voltage on the direction line (10) is thus a voltage divider between the strong pull up (19) and weak pull-down (11) resistors. In one or more embodiments, the weak pull-down resistor (11) may have around 10 times higher resistance than the strong pull-up resistor (19).

Connected to the clock line (14), there is also a pull-up resistor (23), as well as unity gain buffers. The clock line (14) is driven by a totem-pole driver (25) and, advantageously, has faster rise and fall times than an open-drain driver. The data line (12) is configured for bi-directional data transfer, and thereby has two open-drain n-mos transistor drivers (27 and 29) together with unity gain buffers (26) and pull-up resistors (28), one on each side of the data line (12), corresponding to the master and slave interface circuit.

Furthermore, in one or more embodiments, the pull-down and pull-up networks on the direction line enable a reset mode, and a method of determining whether the master and the slave interface are connected. Reset mode is an initially unconnected state when active operation does not occur. This may happen when either the slave or master interface circuit is not powered or is disconnected from the hot-plug link. Due to the pull-down resistor (11) and open-drain driver (13), the master interface state is left permanently at low voltage signal when the slave interface circuit either disconnects from the link, or the slave interface is not powered. In contrast, due to the strong pull-up resistor (19), the slave interface circuit is left permanently at a high voltage signal when the master interface circuit disconnects from the link, or it is not powered. This results from a high voltage drawn from the strong pull-up resistor (19). As will be explained in detail later, these standby voltage signals may be combined with timer circuits to detect disconnections.

As previously shown in FIG. 2, each interface circuit contains a combination of digital control circuitry (22 and 24), with one or more finite state machines underlying their operations. The reset state for each interface circuit is the initial state of operation. As mentioned above, the reset mode is characterized by either a disconnect between the master and slave interface circuit, or a lack of power provided to one of the interface circuits.

Figure 6:
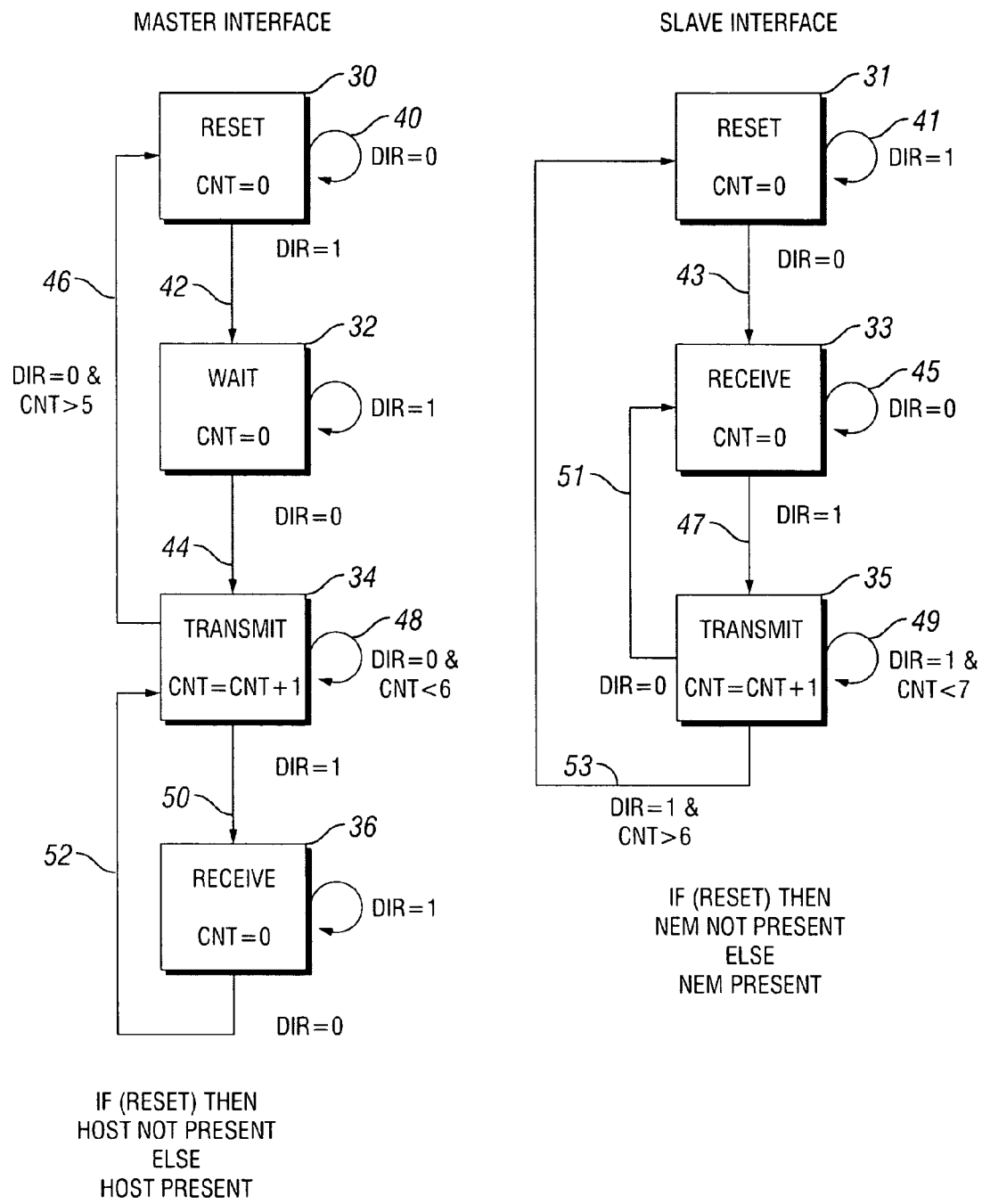
FIG. 6 illustrates a state diagram for the of hot-plug link operation and counter circuits, internal to the logic of each master and slave interface circuit in accordance with one or more embodiments.

In accordance with the timing diagram of FIG. 4, a basic state diagram for the state operation of one or more embodiments is shown in FIG. 6. One skilled in the art will appreciate other state diagrams or finite state machines with a different number of states that adheres to the same operations. The presence detect state machines track the presence states of the remote modules, i.e., the slave state machine identifies the presence of the EM, while the master state machine identifies the presence of the Host. Both in the master and the slave interfaces, the actual data transfer is controlled by logic external to the presence detect state machine. For the master interface circuit, the initial state is a reset state (30), and the circuit remains in the reset state (30) while the direction line is at a low voltage signal (40), DIR=0. As soon as the direction line toggles to a high voltage signal (42), DIR=1, as characterized by a powered slave interface circuit being connected to the master interface circuit, then the circuit switches to a wait state (32). During this wait state (32), the system waits until the control logic toggles the direction line to a low voltage (44) before switching to the transmit state (34).

The transmit state (34) is characterized by transmitting four standard PCIe side-band signals to the slave interface circuit. A counter, CNT, is in place to track the number of signals transmitted, and is incremented (CNT=CNT+1) for each clock cycle that the direction line remains low (48). However, if the direction line remains low, and the counter exceeds the value five, then the circuit detects a disconnect and switches (46) to the reset state. If the direction line is asserted high, then the circuit switches (50) to the receive state (36), and the count value is reset to zero. At the end of receiving the PCIe data signals from the slave interface circuit, the direction line is asserted low, and the circuit switches (52) back to the transmit state.

The slave interface circuit behaves in a similar fashion. The slave circuit's initial state is also the reset state (31), and remains so while the direction line input is at a high voltage signal (41), DIR=1. As the direction line switches to a low voltage signal (43), DIR=0, characterized by a powered master interface circuit connection, the state switches to the receive state (33). In the receive state (33), the slave interface circuit receives four PCIe data signals from the master interface circuit. The master interface circuit is in a transmit state (34) when the slave interface circuit is in this receive state (33). When the direction line is asserted high (47), the slave interface circuit switches to the transmit state (35).

The transmit state (35) of the slave interface circuit is characterized by the slave interface circuit transmitting five PCIe data signals to the master interface circuit. A counter, CNT, is in place to track the number of signals transmitted, and is incremented, (CNT=CNT+1) for each clock cycle that the direction line remains high (49). However, if the direction line remains high, and the counter exceeds the value six, then the circuit detects a disconnect and switches (53) to the reset state. If the direction line is asserted low, then the circuit switches (51) to the receive state (33), and the count value is reset to zero. The circuit remains (45) in the receive state (33), receiving PCIe data signals from the master interface circuit until the direction line is asserted high again (47), at which point the circuit switches back to the transmit state (35).

As previously shown in the timing waveform in FIG. 4, data is bi-directionally communicated between the master and slave interface circuit. In the state diagram, each circuit may typically flip-flop between the corresponding transmit and receive states as the direction line is toggled. However, the counter circuit and reset state helps monitor connectivity. Furthermore, the pull-down and pull-up networks enable this method of determining when a disconnection occurs in data transfer. In the master interface circuit, the direction line output is permanently held in the low state whenever there is a disconnect. Additionally, the host control system toggles the direction line state. Thus, by counting the number of cycles the direction line is consecutively in a low voltage signal state, the master interface circuit will detect when a disconnect occurs, i.e. if the count exceeds a set max count value. This set max count value must be greater than the number of cycles that pass when the host control system periodically changes the direction line. In accordance with embodiments directed to the waveform in FIG. 4, the set max count value must be greater than five clock cycles. If the count exceeds this value, then the circuit will switch to the reset state. One skilled in the art will recognize that variations to the counter and pull-up/pull-down networks may be made to also detect a disconnect.

Similarly, the slave circuit's DIR signal is stuck in a high voltage signal state whenever a disconnect occurs. Thus the slave's counter circuit counts the number of cycles the direction line is consecutively in a high state. If the count exceeds the max count value, the slave interface circuit detects that a disconnect occurred, and the finite state machine switches to the reset mode.

Embodiments may include one or more of the following advantages. The combination of the Presence Detect signal with the direction line eliminates the need for a Presence Detect line to link the host and hot-plug device. The direction line controls the direction of data transfer between the master and slave interface, and a unique timer circuit in conjunction with a pull-down and pull-up network determine when a disconnect occurs. Furthermore, a plurality of data signals, typically eight or nine signals, are combined and communicated over a single data line. Eliminating the Presence Detect line and combining data signals from each hot-plug connection plays a critical role in saving space and cost in server backplane design. In one or more embodiments, a link that may have in the past required ten lines is uniquely reduced to three lines, yielding considerable reduction in expensive and complicated routing layers. Savings add up rather quickly when there may be several tens of hot-plug devices connected on a single server blade. Additionally the circuit is rather simple in design and can be implemented with a small scaled integrated circuit. Furthermore, when a hot-plug device is disconnected from the host device, the circuitry is configured to determine a disconnection and halt data transfer. As a result, data loss and redundancy is minimized.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for linking a hot-plug device to a host comprising:
    a master interface circuit for connection to the host;
    a slave interface circuit for connection to the hot-plug device;
    a direction line, a data line, and a clock line that link the master and slave interface circuits, wherein:
        the data line communicates and combines data signals between the master and slave interface circuits;
        the direction line dictates a direction of a flow of the data based on a direction signal; and
        the clock line synchronizes the flow of the data based on a clock signal; and
    a control logic circuit that detects a Presence Detect signal on the direction line.

2. The apparatus of claim 1, wherein the data line and the clock line are driven by the master interface circuit.

3. The apparatus of claim 1, wherein the data line combines a plurality of data signals stemming from a plurality of standard hot-plug data lines.

4. The apparatus of claim 1, wherein the data line is configured for bi-directional data transfer, corresponding to data sent from the master interface circuit to the slave interface circuit, and data sent from the slave interface circuit to the master interface circuit.

5. The apparatus of claim 1, wherein the control logic circuit comprises a finite state machine within the master interface circuit and a reset state is implemented by a pull-down network configured to detect a disconnect between a host and a hot-plug device connection.

6. The apparatus of claim 5, wherein a Presence Detect signal is detected by a timer circuit within the control logic of the master interface circuit and then further asserted to the host.

7. The apparatus of claim 1, wherein the control logic circuit comprises a finite state machine within the slave interface circuit and a reset state is implemented by a pull-up network configured to detect a disconnect between a host device and a hot-plug device connection.

8. The apparatus of claim 7, wherein a Presence Detect signal is detected by a timer circuit within the control logic of the slave interface circuit and then further asserted to the hot-plug device.

9. The apparatus of claim 1, further comprising a control circuit that toggles the direction signal to assert the Presence Detect signal on the direction line between the master and slave interface circuits.

10. The apparatus of claim 9, wherein the timer circuit counts cycles corresponding to an inactivity in toggling of the direction line signal, asserting the Presence Detect signal to the host when a count value reaches a set maximum count value.

11. The apparatus of claim 10, wherein the timer circuit counts cycles corresponding to an inactivity in toggling of the direction line signal, asserting the Presence Detect signal to the hot-plug device when a count value reaches a set maximum count value.

12. A method of determining a connection between a host and a hot-plug device comprising:
    asserting a direction signal on a direction line to control a direction of a flow of data between the host and the hot-plug device;
    toggling the direction signal to indicate a presence of the hot-plug device; and
    indicating a disconnect after a given period of inactivity in the toggling.

13. The method of claim 12, wherein indicating a disconnect corresponds to asserting a Presence Detect signal from a master interface circuit to the host device.

14. The method of claim 12, wherein indicating a disconnect corresponds to asserting a Presence Detect signal from a slave interface circuit to the hot-plug device.

15. The method of claim 12, further comprising:
    counting cycles of inactivity in toggling of a direction signal on a direction line;
    comparing a count from a timer circuit to a set maximum count value; and
    asserting a Presence Detect signal when the count equals the set maximum count value.

16. A method of linking a host and a hot-plug device via an apparatus comprising a slave interface circuit for connection to the host, and a master interface circuit for connection to the hot-plug device, the method comprising:
    transferring data between the master and slave interface circuits;
    controlling a direction of a flow of the data based on a direction signal on a direction line;
    synchronizing the flow of the data based on a clock signal on a clock line; and
    asserting a Presence Detect signal on the direction line.

17. The method of claim 16, wherein asserting a Presence Detect signal corresponds to toggling the direction line signal on the direction line.

18. The method of claim 16 further comprising combining a plurality of data signals from a plurality of standard hot-plug data lines onto a single data line.

19. The method of claim 16 further comprising detecting a disconnect between the host and the hot-plug device based on a timer circuit corresponding to the master interface circuit, wherein the timer circuit counts cycles corresponding to an inactivity in the toggling of the direction line signal.

20. The method of claim 16 further comprising detecting a disconnect between the host and the hot-plug device based on a timer circuit corresponding to the slave interface circuit, wherein the timer circuit counts cycles corresponding to an inactivity in toggling of the direction line signal.

* * * * *